United States Patent
Liu et al.

(10) Patent No.: US 11,080,066 B2
(45) Date of Patent: Aug. 3, 2021

(54) METHOD FOR STARTING EMBEDDED APPARATUS, AND APPARATUS

(71) Applicant: HUAWEI TECHNOLOGIES CO., LTD., Guangdong (CN)

(72) Inventors: Lei Liu, Hangzhou (CN); Mihu Wang, Hangzhou (CN); Jieliang Huang, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 127 days.

(21) Appl. No.: 16/115,416

(22) Filed: Aug. 28, 2018

(65) Prior Publication Data
US 2018/0365035 A1    Dec. 20, 2018

Related U.S. Application Data

(63) Continuation of application No. PCT/CN2016/104145, filed on Oct. 31, 2016.

(30) Foreign Application Priority Data

Feb. 29, 2016    (CN) .......................... 201610113630.9

(51) Int. Cl.
*G06F 9/445*    (2018.01)
*G06F 9/4401*   (2018.01)
*G06F 8/41*     (2018.01)

(52) U.S. Cl.
CPC ............ *G06F 9/44521* (2013.01); *G06F 8/41* (2013.01); *G06F 9/4401* (2013.01); *G06F 9/445* (2013.01);

(Continued)

(58) Field of Classification Search
None
See application file for complete search history.

(56) References Cited

U.S. PATENT DOCUMENTS 9,146,760 B2 *   9/2015   Powell ................ G06F 9/45533
10,394,570 B2 *  8/2019   Baik .................... G06F 9/4406
(Continued)

FOREIGN PATENT DOCUMENTS

| CN | 1904828 A   | 1/2007 |
|----|-------------|--------|
| CN | 101268443 A | 9/2008 |

(Continued)

*Primary Examiner* — Fahmida Rahman
(74) *Attorney, Agent, or Firm* — Womble Bond Dickinson (US) LLP

(57) ABSTRACT

Embodiments of the present disclosure provide a method for starting an embedded apparatus, and an apparatus, and are applied to the field of embedded technologies, so as to improve a start speed of an embedded apparatus. The method is: A development and compilation apparatus divides a program of a system of an embedded apparatus, where the divided program includes a fast start loader and program segments corresponding to different services. In this way, after compilation and linking are performed on the program segments obtained by division to generate a system image file of the embedded apparatus, the embedded apparatus may first load the fast start loader after downloading the image file, then load one or more services in the image file one by one based on service requirements of different services by using the fast start loader, and then run the one or more loaded services.

6 Claims, 6 Drawing Sheets

(52) U.S. Cl.
CPC ........ *G06F 9/4406* (2013.01); *G06F 9/44578* (2013.01)

(56) References Cited

U.S. PATENT DOCUMENTS

| | | | |
|---|---|---|---|
| 10,445,007 B1* | 10/2019 | Hagen | G06F 3/0659 |
| 2004/0244008 A1 | 12/2004 | Lee | |
| 2006/0064576 A1 | 3/2006 | Chen | |
| 2007/0050762 A1 | 3/2007 | Chen et al. | |
| 2007/0067679 A1 | 3/2007 | Deobald | |
| 2007/0072028 A1* | 3/2007 | Youk | B01D 5/0006 429/414 |
| 2010/0257514 A1* | 10/2010 | Aciicmez | G06F 21/14 717/136 |
| 2012/0278600 A1* | 11/2012 | Mese | G06F 9/4401 713/2 |
| 2017/0228302 A1* | 8/2017 | Chiang | G06F 11/3041 |

FOREIGN PATENT DOCUMENTS

| | | |
|---|---|---|
| CN | 101334737 A | 12/2008 |
| CN | 101515239 A | 8/2009 |
| CN | 101539885 A | 9/2009 |
| CN | 101625647 A | 1/2010 |
| CN | 102455917 A | 5/2012 |
| CN | 102609274 A | 7/2012 |
| CN | 103699412 A | 4/2014 |
| CN | 103793250 A | 5/2014 |
| CN | 104407886 A | 3/2015 |
| CN | 104778066 A | 7/2015 |
| CN | 105760201 A | 7/2016 |

\* cited by examiner

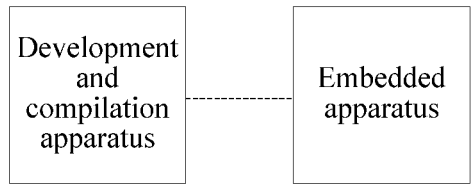

FIG. 1

A development and compilation apparatus divides a program of a system according to a link script of the system of an embedded apparatus, where the divided program includes a fast start loader and program segments obtained by division according to service requirements of different services, and the fast start loader is configured to copy a system image file from a loading domain to an execution domain ⸺ 201

The development and compilation apparatus separately performs, according to the link script, compilation and linking on the fast start loader program segment and the program segments corresponding to the different services, to generate the system image file ⸺ 202

The embedded apparatus loads the fast start loader in the system image file by using a system boot program ⸺ 203

The embedded apparatus runs the fast start loader ⸺ 204

After running the fast start loader, the embedded apparatus loads, by segments according to the service requirements of the different service, one or more services corresponding to remaining image files in the system image file other than the fast start loader, and runs the one or more loaded services ⸺ 205

FIG. 2

METHOD FOR STARTING EMBEDDED APPARATUS, AND APPARATUS

CROSS-REFERENCE TO RELATED APPLICATIONS

This application is a continuation of International Application No. PCT/CN2016/104145, filed on Oct. 31, 2016, which claims priority to Chinese Patent Application No. 201610113630.9, filed on Feb. 29, 2016. The disclosures of the aforementioned applications are hereby incorporated by reference in their entireties.

TECHNICAL FIELD

The present disclosure relates to the field of embedded technologies, and in particular, to a method for starting an embedded apparatus, and an apparatus.

BACKGROUND

An embedded device includes a host machine and a target machine. The host machine and the target machine are developed based on different architectures. The host machine, that is, a development and compilation apparatus, is responsible for development and compilation. Before the target machine runs an embedded development, a cross tool chain, a network protocol stack, and a driver development fshould to be installed first. Then, the target machine runs a program that is compiled and downloaded from the host machine. The embedded device is also referred to as an embedded apparatus.

For an embedded apparatus, a system start speed of the embedded apparatus is an important measurement indicator. In particular, for a consumption embedded apparatus, such as an event data recorder, a camera, or a smart printing server, a system start time directly affects user experience. Currently, a system cold start manner in the industry is: loading a system start image file in storage space to a memory by using a system boot program, and then starting a system. For example, in one solution, a region with no power failure is configured in a system; when the system is powered off, a program that is started when the system is powered on is loaded to the region with no power failure; and when the system is started again, the program in the region with no power failure is first executed, thereby achieving an objective of a fast start. However, in some embedded devices, regions with no power failure are not configured in some products, that is, powering off the system means a power failure. Therefore, the solution is not suitable for all embedded apparatuses. In another solution, during a process of performing development and compilation by a host machine, attributes of code functions and variables, for startup program segments, in a developed program are set; and then when a link is compiled, the code functions and variables that are related to starting are set in an independent segment of a first half of a file generated by compilation. In this way, when loading an image file to a memory, a system of a target machine first loads and runs the segment that is related to starting and that is of the first half, and then loads and runs a remaining segment. However, in this solution, a developer should know all source code of code functions and variables related to system starting. In addition, some code functions related to starting may be provided in a manner of library files instead of source code. Consequently, fast starting cannot be implemented by using this solution.

Therefore, how to provide a general method for fast starting an embedded apparatus is a problem that should be resolved.

SUMMARY

Embodiments of the present disclosure provide a method for starting an embedded apparatus, and an apparatus, so as to improve a start speed of an embedded apparatus.

According to a first aspect, a method for starting an embedded apparatus is provided, including:

loading a fast start loader in a system image file by using a system boot program, where the fast start loader is configured to copy the system image file from a loading domain to an execution domain;

running the fast start loader;

loading, one by one according to service requirements of different services after running the fast start loader, one or more services corresponding to remaining image files in the system image file other than the fast start loader, and running the one or more loaded services.

Therefore, in a start process of the embedded apparatus, a fast start loader in a system image file is first loaded, that is, a smallest kernel is first loaded. After the kernel is started, one or more services corresponding to remaining image files are loaded by segments according to service requirements of different services by using the fast start loader. In this way, a service start time can be reduced, and a start speed of the embedded apparatus can be increased.

In a possible design, the loading, one by one according to service requirements of different services, one or more services corresponding to remaining image files in the system image file other than the fast start loader, and running the one or more loaded services includes:

controlling the fast start loader to load a fast startup program segment in the system image file, where the fast startup program segment includes a mission-critical service in the embedded apparatus;

running the mission-critical service;

controlling the fast start loader to load a non-fast startup program segment in the system image file, where the non-fast startup program segment includes remaining services in the embedded apparatus other than the mission-critical service; and running the remaining services.

Therefore, when an image file of a service is loaded by segments, an objective of first loading and running a mission-critical service of a system can be achieved, and then remaining services corresponding to the image file are loaded and run, thereby preferentially starting the mission-critical service to increase a start speed.

In a possible design, the controlling the fast start loader to load a fast startup program segment in the system image file includes:

controlling the fast start loader to obtain a start address and an end address of the fast startup program segment in the system image file;

controlling the fast start loader to obtain a length of the fast startup program segment according to the start address and the end address of the fast startup program segment; and controlling the fast start loader to load the fast startup program segment according to the start address of the fast startup program segment and the length of the fast startup program segment.

Therefore, when a mission-critical service is loaded to a loading domain, a length of a program segment is obtained according to a start address and an end address, and the program segment is loaded according to the length and the start address. This can implement loading precision at a code row level, thereby precisely controlling a loading occasion. Real-time detection of whether loading reaches the end address can be avoided by performing loading according to the length, and the entire program segment is loaded only according to the start address and the length, thereby improving a service loading speed, and further improving a start speed of the embedded apparatus.

In a possible design, the controlling the fast start loader to load a non-fast startup program segment in the system image file includes:

controlling the fast start loader to obtain a start address and an end address of the non-fast startup program segment in the system image file;

controlling the fast start loader to obtain a length of the non-fast startup program segment according to the start address and the end address of the non-fast startup program segment; and controlling the fast start loader to load the non-fast startup program segment according to the start address of the non-fast startup program segment and the length of the non-fast startup program segment.

Therefore, when a non-mission-critical service is loaded to a loading domain, loading precision at a code row level can also be implemented, thereby precisely controlling a loading occasion.

According to a second aspect, a development and compilation method for an embedded apparatus is provided, including:

dividing a program of a system according to a link script of the system of the embedded apparatus, where the divided program includes a fast start loader and program segments that are obtained by division according to service requirements of different services and that correspond to the different services, and the fast start loader is configured to copy a system image file from a loading domain to an execution domain; and separately performing, according to the link script, compilation and linking on the fast start loader and the program segments corresponding to the different services, to generate the system image file.

Therefore, a program of a system is divided, and compilation and linking processing is performed on different program segments obtained by division, so that after an image file is downloaded to the embedded apparatus, the embedded apparatus loads the image file by segments and runs the image file, thereby increasing a start speed of the embedded apparatus.

In a possible design, the program segments corresponding to the different services include a fast startup program segment and a non-fast startup program segment, where the fast startup program segment corresponds to a mission-critical service in the embedded apparatus, and the non-fast startup program segment corresponds to remaining services in the embedded apparatus other than the mission-critical service.

Therefore, when the embedded apparatus loads and runs an image file, a mission-critical service in the image file may be first loaded, and then a non-mission-critical service in the image file is loaded and run, thereby improving user experience while a start speed of a system is increased.

In a possible design, when the program segments corresponding to the different services are the fast startup program segments, the performing, by a host machine according to the link script, compilation and linking on the program segments corresponding to the different services includes:

decompressing, by using a first cross compilation command, a library file corresponding to each mission-critical service, and generating an intermediate file corresponding to each mission-critical service, where any intermediate file includes a read-only data (rodata) segment, a data (data) segment, and a text (text) segment that are of a mission-critical service corresponding to any intermediate file; and linking, by using a second cross compilation command, the intermediate file corresponding to each mission-critical service to an executable and linkable format ELF corresponding to the fast startup program segment, where in the executable and linkable format (Executable and Linkable Format, ELF) corresponding to the fast startup program segment, a read-only data segment of each mission-critical service is in a same program segment, a data segment of each mission-critical service is in a same program segment; and a text segment of each mission-critical service is in a same program segment.

Therefore, when compilation and linking processing is first performed on a library file of a mission-critical service, and the library file of the mission-critical service can be directly compiled and linked without knowing source code of a system, that is, a library developed by a third party is linked and orchestrated without depending on source code of the library of the third party, thereby making compilation and linking more flexible, and increasing a start speed of the system.

In a possible design, before the decompressing, by using a first cross compilation command, a library file corresponding to each mission-critical service, the method further includes:

compiling, according to the link script, source code corresponding to each mission-critical service to generate the library file, where the library file includes a static library file or a dynamic library file.

Therefore, in a case in which a host machine provides source code, source code of a mission-critical service may be compiled to generate a library file, and then the library file is compiled and linked, thereby making compilation and linking more flexible.

In a possible design, when the program segments corresponding to the different services are the non-fast startup program segments, the performing compilation and linking on the fast start loader and the program segments corresponding to the different services includes:

linking, by using the second cross compilation command, a library file corresponding to the fast start loader to an ELF corresponding to the fast start loader, and linking a library file corresponding to the non-fast startup program segment to an ELF corresponding to the non-fast startup program segment, where a read-only data segment, a data segment, and a text segment that are of the fast start loader are separately in a same program segment of the ELF; and a read-only data segment, a data segment, and a text segment that correspond to the non-fast startup program segment are separately in a same program segment of the ELF.

Therefore, when compilation and linking processing is first performed on a library file of a non-mission-critical service, the library file of the non-mission-critical service can be directly compiled and linked without knowing source code of a system, that is, a library developed by a third party is linked and orchestrated without depending on source code of the library of the third party, thereby making compilation and linking more flexible, and increasing a start speed of the system.

In a possible design, before the second cross compilation command is used, the method further includes:

compiling, according to the link script, source code corresponding to the fast start loader to generate a library file corresponding to the fast start loader; and compiling source code corresponding to the non-fast startup program segment to generate a library file corresponding to the non-fast startup program segment.

Therefore, in a case in which source code is provided, source code of a non-mission-critical service may be compiled to generate a library file, and then the library file is compiled and linked, thereby making compilation and linking more flexible.

According to a third aspect, an embedded apparatus is provided, including:

a system boot program, used to load a fast start loader in a system image file, where the fast start loader is configured to copy the system image file from a loading domain to an execution domain;

a running unit, configured to run the fast start loader; and the fast start loader, configured to load, one by one according to service requirements of different services, one or more services corresponding to remaining image files in the system image file other than the fast start loader program segment, where the running unit is further configured to run the one or more loaded services.

Therefore, in a start process of the embedded apparatus, a fast start loader in a system image file is first loaded, that is, a smallest kernel is first loaded. After the kernel is started, different services corresponding to remaining image files are loaded by segments according to service requirements by using the fast start loader. In this way, a service start time can be reduced, and a start speed of the embedded apparatus can be increased.

In a possible design, the fast start loader is configured to load a fast startup program segment in the system image file, where the fast startup program segment includes a mission-critical service in the embedded apparatus;

the running unit is configured to run the mission-critical service;

the fast start loader is configured to load a non-fast startup program segment in the system image file, where the non-fast startup program segment includes remaining services in the embedded apparatus other than the mission-critical service; and the running unit is configured to run the remaining services.

Therefore, when an image file of a service is loaded by segments, an objective of first loading and running a mission-critical service of a system can be achieved, and then remaining services corresponding to the image file are loaded and run, thereby preferentially starting the mission-critical service to increase a start speed.

In a possible design, the fast start loader is configured to:

obtain a start address and an end address of the fast startup program segment in the system image file;

obtain a length of the fast startup program segment according to the start address and the end address of the fast startup program segment; and load the fast startup program segment according to the start address of the fast startup program segment and the length of the fast startup program segment.

Therefore, when the embedded apparatus loads a mission-critical service to a loading domain, loading precision at a code row level can be implemented, thereby precisely controlling a loading occasion.

In a possible design, the fast start loader is configured to:
the fast start loader is configured to:

obtain a start address and an end address of the non-fast startup program segment in the system image file;

obtain a length of the non-fast startup program segment according to the start address and the end address of the non-fast startup program segment; and load the non-fast startup program segment according to the start address of the non-fast startup program segment and the length of the non-fast startup program segment.

Therefore, when the embedded apparatus loads a non-mission-critical service to a loading domain, loading precision at a code row level can also be implemented, thereby precisely controlling a loading occasion.

According to a fourth aspect, a development and compilation apparatus is provided, including:

a division unit, configured to divide a program of a system according to a link script of the system of an embedded apparatus, where the divided program includes a fast start loader and program segments that are obtained by division according to service requirements of different services and that correspond to the different services, and the fast start loader is configured to copy a system image file from a loading domain to an execution domain; and a compilation and linking unit, configured to separately perform, according to the link script, compilation and linking on the fast start loader and the program segments corresponding to the different services, to generate the system image file.

Therefore, a host machine divides a program of a system, and performs compilation and linking processing on different program segments obtained by division, so that after an image file is downloaded to the embedded apparatus, the embedded apparatus loads the image file by segments and runs the image file, thereby increasing a start speed of the embedded apparatus.

In a possible design, the program segments corresponding to the different services include a fast startup program segment and a non-fast startup program segment, where the fast startup program segment corresponds to a mission-critical service in the embedded apparatus, and the non-fast startup program segment corresponds to remaining services other than the mission-critical service.

Therefore, when the embedded apparatus loads and runs an image file, a mission-critical service in the image file may be first loaded, and then a non-mission-critical service in the image file is loaded and run, thereby improving user experience while a start speed of a system is increased.

In a possible design, when the program segments corresponding to the different services are the fast startup program segments, the compilation and linking unit is configured to:

decompress, by using a first cross compilation command, a library file corresponding to each mission-critical service, and generate an intermediate file corresponding to each mission-critical service, where any intermediate file includes a read-only data segment, a data segment, and a text segment that are of a mission-critical service corresponding to any intermediate file; and link, by using a second cross compilation command, the intermediate file corresponding to each mission-critical service to an executable and linkable format ELF corresponding to the fast startup program segment, where in the executable and linkable format ELF corresponding to the fast startup program segment, a read-only data segment of each mission-critical service is in a same program segment, a data segment of each mission-critical service is in a same program segment, and a text segment of each mission-critical service is in a same program segment.

Therefore, when compilation and linking processing is first performed on a library file of a mission-critical service, the library file of the mission-critical service can be directly compiled and linked without knowing source code of a system, that is, a library developed by a third party is linked and orchestrated without depending on source code of the library of the third party, thereby making compilation and linking more flexible, and increasing a start speed of the system.

In a possible design, the compilation and linking unit is configured to:

compile, according to the link script, source code corresponding to each mission-critical service to generate a library file, where the library file includes a static library file or a dynamic library file.

Therefore, in a case in which a host machine provides source code, source code of a mission-critical service may be compiled to generate a library file, and then the library file is compiled and linked, thereby making compilation and linking more flexible.

In a possible design, when the program segments corresponding to the different services are the non-fast startup program segments, the compilation and linking unit is configured to:

link, by using the second cross compilation command, a library file corresponding to the fast start loader to an ELF corresponding to the fast start loader, and link a library file corresponding to the non-fast startup program segment to an ELF corresponding to the non-fast startup program segment, where a read-only data segment, a data segment, and a text segment that are of the fast start loader are separately in a same program segment of the ELF; and a read-only data segment, a data segment, and a text segment that correspond to the non-fast startup program segment are separately in a same program segment of the ELF.

Therefore, when compilation and linking processing is performed on a library file of a non-mission-critical service, the library file of the non-mission-critical service can be directly compiled and linked without knowing source code of a system, that is, a library developed by a third party is linked and orchestrated without depending on source code of the library of the third party, thereby making compilation and linking more flexible, and increasing a start speed of the system.

In a possible design, the compilation and linking unit is configured to:

compile, according to the link script, source code corresponding to the fast start loader to generate a library file corresponding to the fast start loader; and compile source code corresponding to the non-fast startup program segment to generate a library file corresponding to the non-fast startup program segment.

Therefore, in a case in which a host machine provides source code, source code of a non-mission-critical service may be compiled to generate a library file, and then the library file is compiled and linked, thereby making compilation and linking more flexible.

Therefore, the embodiments of the present disclosure provide a method for starting an embedded apparatus, and an apparatus. A program of a system of an embedded apparatus is divided, and the divided program includes a fast start loader and program segments corresponding to different services. In this way, after the program segments obtained by division are compiled and linked to generate an image file for starting the system, the embedded apparatus may first load the fast start loader in the image file after downloading the image file, then load, by segments according to service requirements by using the fast start loader, one or more services corresponding to remaining image files, and run the one or more services corresponding to the remaining image files. That is, in a start process of the embedded apparatus, a fast start loader in a system image file is first loaded, that is, a smallest kernel is first loaded. After the kernel is started, one or more services corresponding to remaining image files are loaded by segments according to service requirements of different services by using the fast start loader, and then the one or more loaded services are run. In this way, a service start time can be reduced, and a start speed of the embedded apparatus can be increased.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

FIG. 1 is a schematic diagram of an embedded device according to an embodiment of the present disclosure.

FIG. 2 is a schematic flowchart of a method for starting an embedded apparatus according to an embodiment of the present disclosure.

DESCRIPTION OF EMBODIMENTS

Figure 3:
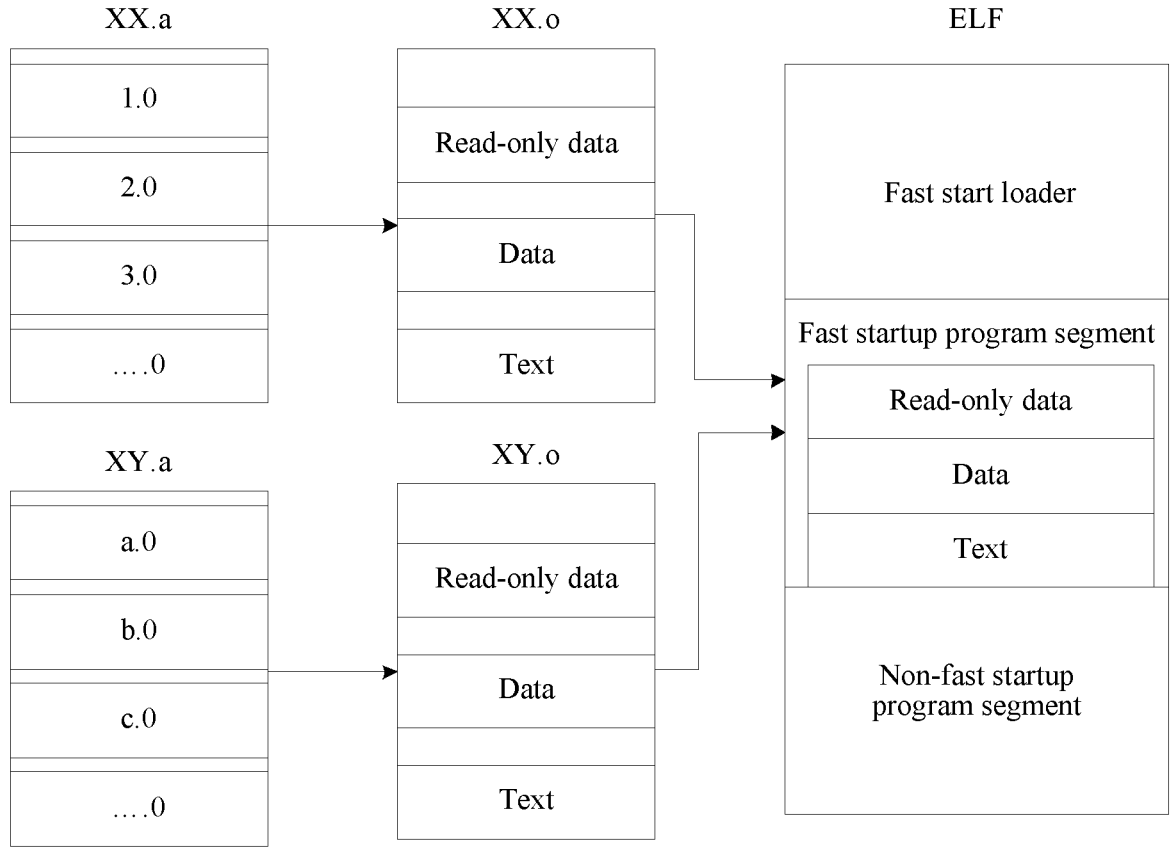
FIG. 3 is a schematic diagram of compiling and linking a library file according to an embodiment of the present disclosure.

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Embodiments of the present disclosure may be applied to an embedded device. As shown in FIG. 1, the embedded device includes an embedded apparatus and a development and compilation apparatus. The development and compilation apparatus is a host machine and the embedded apparatus is a target machine. The present disclosure is used to fast start the embedded apparatus. The target machine may be an event data recorder, a smart printing server, a camera, or the like. Correspondingly, the host machine is responsible for developing and compiling a system program of the target machine, such as the event data recorder, the smart printing server, or the camera.

The host machine may first modify a link script of a system of the target machine, so that the host machine divides a program of the system of the target machine according to the link script used in the system of the target machine. The divided program includes a fast start loader program segment and program segments corresponding to different services that are obtained by division according to service requirements. The fast start loader is configured to: copy an image file of the system of the target machine from a loading domain to an execution domain; and then perform, according to the link script, compilation and linking on the fast start loader program segment and the program segments corresponding to the different services, to generate an image file for starting the system.

Therefore, after the image file is downloaded to the target machine, the target machine may first load the fast start loader program segment in the image file by using a system boot program. The fast start loader is configured to copy the image file of the system of the target machine from the loading domain to the execution domain. Then the fast start loader is run. After the fast start loader is run, one or more services corresponding to remaining image files are loaded by segments according to service requirements of different services and run. That is, in a start process of the target machine, the fast start loader program segment in the system image file is first loaded, that is, a smallest kernel is first loaded. After the kernel is started, the one or more services corresponding to the remaining image files are loaded by segments according to the service requirements by using the fast start loader. Then the one or more loaded services are run. In this way, a service start time can be reduced, and a start speed of the embedded apparatus can be increased.

An embodiment of the present disclosure provides a method for starting an embedded apparatus, as shown in FIG. 2, including:

201: A development and compilation apparatus divides a program of a system according to a link script of the system of the embedded apparatus, where the divided program includes a fast start loader and program segments obtained by division according to service requirements of different services, and the fast start loader is configured to copy a system image file from a loading domain to an execution domain.

The loading domain may be an area in which system hardware stores an image file, and is generally a nonvolatile area in which a power failure occurs. The execution domain may be an area in which a system runs an image file, and is generally a volatile memory area in which a power failure occurs.

In an implementable manner, the development and compilation apparatus, that is, a host machine, may divide the program of the system according to the link script of the system of the embedded apparatus. The divided program includes a fast start loader, a fast startup program segment, and a non-fast startup program segment. The fast start loader is a fast start loader program segment.

Specifically, the link script that is in the host machine and that is used in the system of the target machine may be modified first, so that the modified link script can instruct the host machine to divide a program for starting the system into a fast start loader, a fast startup program segment, and a non-fast startup program segment. The link script may be used to designate designated positions, an alignment manner, a storage manner, and the like of some program segments.

The fast start loader may be configured to copy the system image file of the target machine from the loading domain to the execution domain. The loading domain is an area in which system hardware of the target machine stores an image file, and the execution domain is an area in which the system of the target machine runs the image file. It may be understood that, in this application, program code that is in the system image file of the target machine and that is copied from the loading domain to the execution domain is encapsulated into an interface, and can be independently run. The fast startup program segment includes a mission-critical service of the target machine, and the non-fast startup program segment includes remaining services other than the mission-critical service. For example, when the target machine is an event data recorder, a mission-critical service of the target machine may be a video recording service or a wireless connection service; and remaining services may include a Bluetooth service, a photographing service, and the like.

202: The development and compilation apparatus separately performs, according to the link script, compilation and linking on a fast start loader program segment and the program segments corresponding to the different services, to generate the system image file.

Specifically, the fast start loader may be compiled and linked first, and then the program segments corresponding to the different services are compiled and linked. For example, a program segment corresponding to a mission-critical service of the target machine and a program segment corresponding to a non-mission-critical service of the target machine are separately compiled and linked.

In a possible design, for a program of the fast start loader and a program of the non-fast startup program segment, if the programs are library files provided by a third party, the library files can be directly linked without knowing source code corresponding to the library files. Specifically, the host machine links, by using a second cross compilation command, the library file corresponding to the fast start loader to an ELF corresponding to the fast start loader, and links the library file corresponding to the non-fast startup program segment to an ELF corresponding to the non-fast startup program segment. A read-only data (rodata) segment, a data (data) segment, and a text (text) segment that correspond to the fast start loader are separately in a same program segment of the ELF; and a rodata segment, a data segment, and a text segment that correspond to the non-fast startup program segment are separately in a same program segment of the ELF. A library file may be a static library file, and is marked as a file .a. Alternatively, a library file may be a dynamic library file, and is marked as a file .so.

For example, when the library file corresponding to the fast start loader is linked, or the library file corresponding to the non-fast startup program segment is linked, a rodata segment, a data segment, and a text segment that are of each file .a corresponding to the fast start loader or each file .a corresponding to the non-fast startup program segment are separately located in a same program segment. That is, rodata segments of the files .a in the library file are linked; data segments of the files .a in the library are linked; and text segments of the files .a in the library are linked. Then, in a generated image file, that is, in an ELF, rodata segments, data segments, and text segments of the fast start loader program segment are separately located in a same program segment.

If the program of the fast start loader and the program of the non-fast startup program segment are source code instead of the library files provided by the third party, before using the second cross compilation command, the host machine may first compile, according to the link script, source code corresponding to the fast start loader to generate a library file corresponding to the fast start loader; and compile source code corresponding to the non-fast startup program segment to generate a library file corresponding to the non-fast startup program segment.

For the fast startup program segment, if the program is a library file provided by the third party, because the fast startup program segment corresponds to a mission-critical service, that is, a designated service that should be preferentially started, a library file corresponding to each mission-critical service may be decompressed by using a first cross compilation command, to generate an intermediate file corresponding to each mission-critical service, where any intermediate file includes a read-only data segment, a data segment, and a text segment that are of a mission-critical service corresponding to any intermediate file. Then, an intermediate file corresponding to each mission-critical service is linked, by using the second cross compilation command, to an executable and linkable format ELF corresponding to the fast startup program segment. In the executable and linkable format ELF corresponding to the fast startup program segment, the read-only data segment of each mission-critical service is in a same program segment, the data segment of each mission-critical service is in a same program segment, and the text segment of each mission-critical service is in a same program segment.

For example, the first cross compilation command may be xxx-ar, and is used to decompress a library file. That is, an intermediate file (marked as a file .o) is generated by using a file .a, where xxx changes as a cross compiler changes. The second cross compilation command may be xxx-ld, and is used to link multiple intermediate files to generate an ELF, where xxx changes as a cross compiler changes. As shown in FIG. 3, XX.a and XY.a represent library files of two different mission-critical services. 1.0, 2.0, and the like in the file XX.a and a.0, b.0, and the like in the file XY.a represent different files .a. Each file .a includes a rodata segment, a data segment, and a text segment. Each .a file may be first decompressed by using a command xxx-ar. The decompressed file XX.a corresponds to a file XX.o, and the decompressed file XY.a corresponds to a file XY.o. A rodata segment in the file XX.o is generated by linking all rodata segments in the file XX.a, a data segment in the file XX.o is generated by linking all data segments in the file XX.a, and a text segment in the file XX.o is generated by linking all text segments in the file XX.a. Similarly, a rodata segment in the file XY.o is generated by linking all rodata segments in the file XY.a, a data segment in the file XY.o is generated by linking all data segments in the file XY.a, and a text segment in the file XY.o is generated by linking all text segments in the file XY.a. Then, the file XX.o and the file XY.o are linked by using xxx-ld to generate a fast startup program segment in the ELF. The fast startup program segment also includes a rodata segment, a data segment, and a text segment. The rodata segment in the fast startup program segment is generated by linking the data segment in the file XX.o and the rodata segment in the file XY.o. The data segment in the fast startup program segment is generated by linking the data segment in the file XX.o and the data segment in the file XY.o. The text segment in the fast startup program segment is generated by linking the text segment in the file XX.o and the text segment in the file XY.o.

If the fast startup program segment is source code instead of the library file provided by the third party, before a library file corresponding to each mission-critical service is decompressed by using the first cross compilation command, the host machine compiles, according to the link script, source code corresponding to each mission-critical service to generate a library file, and the library file includes a static library file or a dynamic library file. For example, for an event data recorder, mission-critical services of the event data recorder include a photographing service and a wireless connection service. Source code (marked as a file .c) corresponding to the photographing service and source code corresponding to the wireless connection service are compiled to generate a file .a (a static library file) or a file .so (a dynamic library file). Then the file .a or the file .so is decompressed into files .o by using xxx-ar; and then the files .o are linked by using xxx-ld to generate an ELF of a fast startup program segment.

Therefore, each library file may be linked to different designated segments according to different features by modifying the link script, and may be stored at different designated positions.

After the host machine completes compilation and linking, the ELF may be downloaded from the host machine to a Flash chip in the target machine. When the target machine is started and runs, the ELF, that is, an image file, is loaded from the Flash chip to the embedded apparatus, that is, a memory of the target machine. The target machine is started. A specific loading process may be as follows.

203: The embedded apparatus loads the fast start loader in the system image file by using a system boot program.

Specifically, the system boot program may be modified, so that the system boot program first loads the fast start loader in the system image file when loading the ELF. A start address and an end address of the fast start loader may be preset in the boot program. When loading the fast start loader, the system boot program first obtains a length of the fast start loader according to the start address and the end address of the fast start loader, and then loads the fast start loader according to the start address and the length of the fast start loader.

204: The embedded apparatus runs the fast start loader.

The fast start loader is configured to copy the system image file of the target machine from a loading domain to an execution domain. Equivalently, the system image file is copied from the loading domain to the execution domain and is encapsulated into an interface. The fast start loader is a smallest kernel of a program of the system. When the system is started, only the smallest kernel is first loaded, so that after the kernel is started and run, remaining segments are loaded.

205: After running the fast start loader, the embedded apparatus loads, by segments according to the service requirements of different service, one or more services corresponding to remaining image files in the system image file other than the fast start loader, and runs the one or more loaded services.

In this way, after the fast start loader, that is, the kernel, is first loaded, the fast start loader can load the different services corresponding to the remaining image files by segments, instead of loading the complete system image file and then running the system image file, thereby increasing a start speed of the target machine.

This embodiment of the present disclosure provides a method for starting an embedded apparatus. A development and compilation apparatus divides a program of a system of the embedded apparatus in advance, and the divided program includes a fast start loader and program segments corresponding to different services. In this way, after the program segments obtained by division are compiled and linked to generate an image file for starting the system, the embedded apparatus may first load the fast start loader in the image file after downloading the image file, then load, by segments according to service requirements by using the fast start loader, one or more services corresponding to remaining image files, and run the one or more services corresponding to the remaining image files. That is, in a start process of the embedded apparatus, a fast start loader in a system image file is first loaded, that is, a smallest kernel is first loaded. After the kernel is started, one or more services corresponding to remaining image files are loaded by segments according to service requirements of different services by using the fast start loader, and then the one or more loaded services are run. In this way, a service start time can be reduced, and a start speed of the embedded apparatus can be increased.

Figure 4:
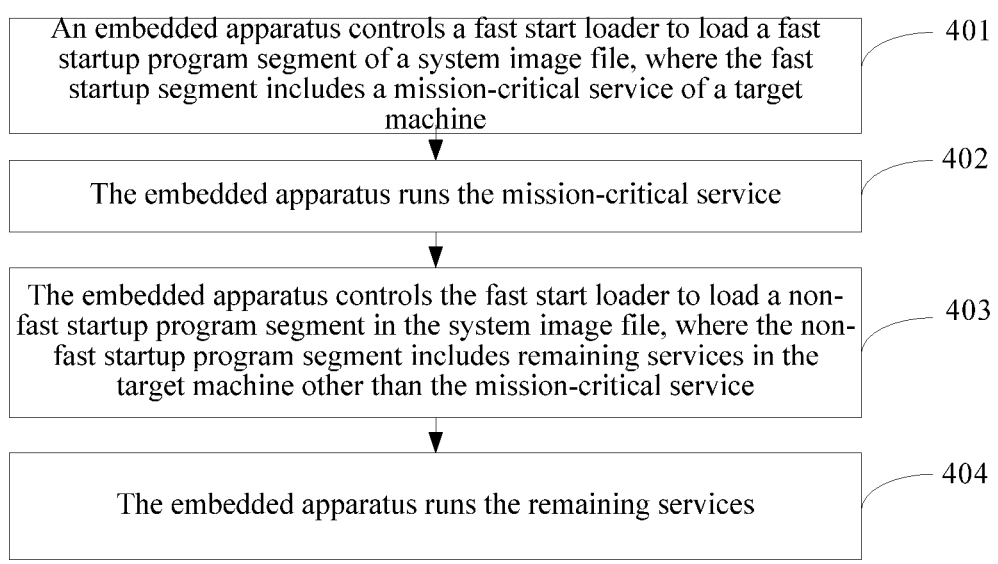
FIG. 4 is a schematic flowchart of a method for starting an embedded apparatus according to an embodiment of the present disclosure.

In an implementable manner of the present disclosure, referring to FIG. 4, block 205 may specifically include 401 to 404.

401: The embedded apparatus controls the fast start loader to load the fast startup program segment in the system image file, where the fast startup segment includes a mission-critical service of the target machine.

After the fast start loader is run, the fast start loader is controlled to first load the fast startup program segment in the system image file. The fast startup program segment corresponds to the mission-critical service of the target machine. Therefore, the target machine does not need to be started after loading the complete system image file, but loads the system image file by segments, and first loads the mission-critical service corresponding to the system image file.

Specifically, a start address and an end address are marked in the fast startup program segment. The fast start loader obtains the start address and the end address of the fast startup program segment; obtains a length of the fast startup program segment according to the start address and the end address of the fast startup program segment; and then loads the fast startup program segment according to the start address of the fast startup program segment and the length of the fast startup program segment. Therefore, for an occasion for loading the fast startup program segment, loading precision at a code row level can be implemented.

402: The embedded apparatus runs the mission-critical service.

For example, mission-critical services corresponding to a fast startup program segment of an event data recorder include a photographing service and a wireless connection service. When the event data recorder is started, after a fast start loader is loaded, the fast start loader first starts the photographing service and the wireless connection service, and implements data synchronization of the mission-critical services. In this way, a start time of the event data recorder is greatly reduced, achieving an objective of first loading, starting, and running the mission-critical services of the system.

403: The embedded apparatus controls the fast start loader to load a non-fast startup program segment in the system image file, where the non-fast startup program segment includes remaining services in the target machine other than the mission-critical service.

Figure 5:
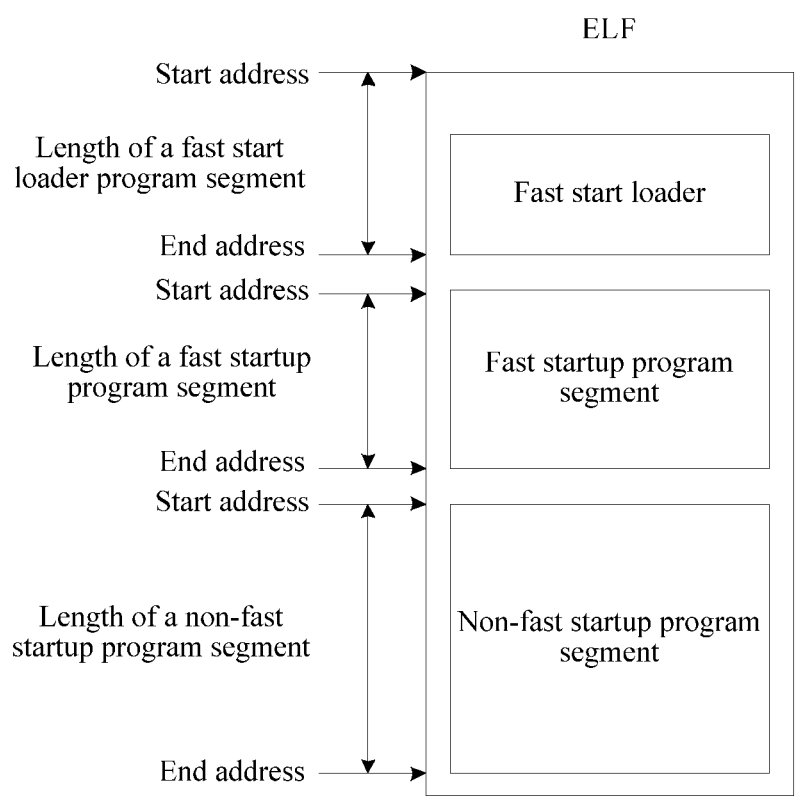
FIG. 5 is a schematic diagram of loading an ELF according to an embodiment of the present disclosure.

The fast start loader obtains a start address and an end address of the non-fast startup program segment; obtains a length of the non-fast startup program segment according to the start address and the end address of the non-fast startup program segment; and then loads the non-fast startup program segment according to the start address of the non-fast startup program segment and the length of the non-fast startup program segment, as shown in FIG. 5. For example, a non-mission-critical service of an event data recorder includes a Bluetooth service, and then after a mission-critical service of the event data recorder is loaded and run, the Bluetooth service is loaded. That is, the system loads a service of a target machine according to service requirements by segments.

404: The embedded apparatus runs the remaining services.

Therefore, in the method for starting the embedded apparatus provided by this embodiment of the present disclosure, a development and compilation apparatus divides a program of a system of an embedded apparatus, and the divided program includes a fast start loader and program segments corresponding to different services. In this way, after the program segments obtained by division are compiled and linked to generate an image file for starting the system, the embedded apparatus may first load the fast start loader in the image file after downloading the image file, then load, by segments according to service requirements by using the fast start loader, different services corresponding to remaining image files, and run the different services corresponding to the remaining image files. That is, in a start process of the embedded apparatus, a fast start loader in a system image file is first loaded, that is, a smallest kernel is first loaded. After the kernel is started, different services corresponding to remaining image files are loaded by segments according to service requirements by using the fast start loader; and then the different services corresponding to the remaining image files are run. In this way, a service start time can be reduced, and a start speed of the embedded apparatus can be increased.

Figure 6:
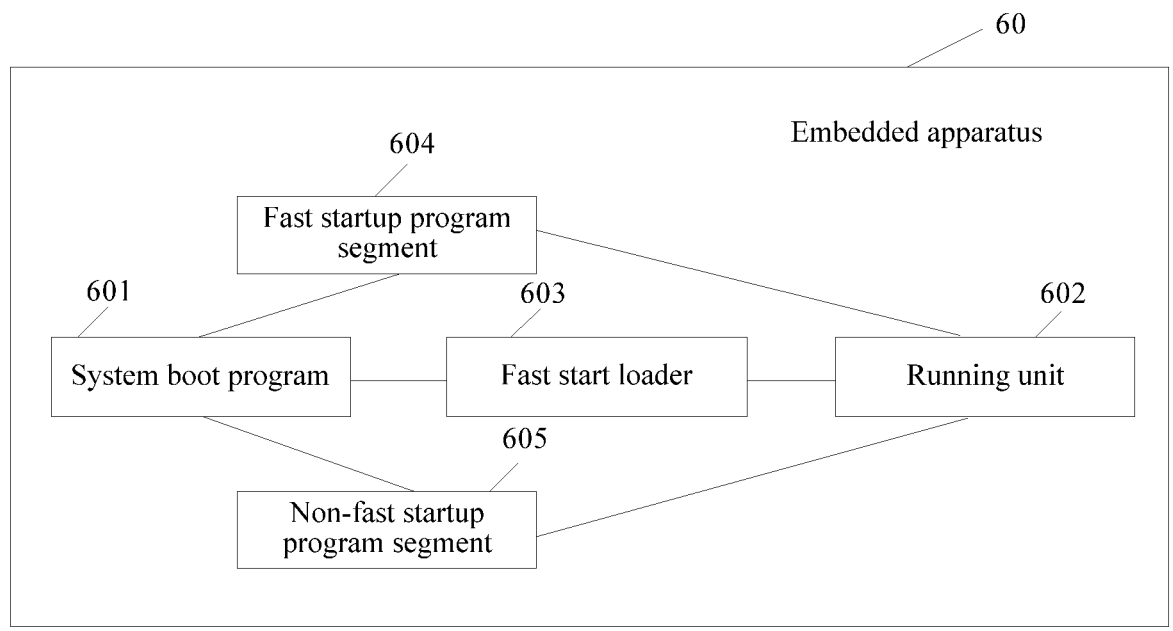
FIG. 6 is a schematic structural diagram of an embedded apparatus according to an embodiment of the present disclosure.

An embodiment of the present disclosure provides an embedded apparatus 60, as shown in FIG. 6, including:

a system boot program 601, used to load a fast start loader in a system image file, where the fast start loader is configured to copy the system image file from a loading domain to an execution domain;

a running unit 602, configured to run the fast start loader; and the fast start loader 603, configured to load, by segments according to service requirements of different services, one or more services corresponding to remaining image files in the system image file other than the fast start loader.

The running unit 602 is further configured to run the one or more loaded services.

Optionally, the fast start loader 603 is configured to load a fast startup program segment 604 in the system image file, where the fast startup program segment 604 includes a mission-critical service in the embedded apparatus;

the running unit 602 is configured to run the mission-critical service;

the fast start loader 603 is configured to load a non-fast startup program segment 605 in the system image file, where the non-fast startup program segment 605 includes remaining services in the embedded apparatus other than the mission-critical service; and the running unit 602 is configured to run remaining services.

Optionally, the fast start loader 603 is configured to:

obtain a start address and an end address of the fast startup program segment 604 in the system image file;

obtain a length of the fast startup program segment 604 according to the start address and the end address of the fast startup program segment 604; and load the fast startup program segment according to the start address of the fast startup program segment 604 and the length of the fast startup program segment 604.

Optionally, the fast start loader 603 is configured to:

obtain a start address and an end address of the non-fast startup program segment 605 in the system image file;

obtain a length of the non-fast startup program segment 605 according to the start address and the end address of the non-fast startup program segment 605; and load the non-fast startup program segment 605 according to the start address of the non-fast startup program segment 605 and the length of the non-fast startup program segment 605.

Therefore, the embedded apparatus provided in this embodiment of the present disclosure first loads a fast start loader in a system image file after downloading the image file, then loads, by segments according to service requirements by using the fast start loader, different services corresponding to remaining image files, and runs the different services corresponding to the remaining image files. That is, in a start process of the embedded apparatus, a fast start loader in a system image file is first loaded, that is, a smallest kernel is first loaded. After the kernel is started, different services corresponding to remaining image files are loaded by segments according to service requirements by using the fast start loader, and then the different services corresponding to the remaining image files are run. In this way, a service start time can be reduced, and a start speed of the embedded apparatus can be increased.

Figure 7:
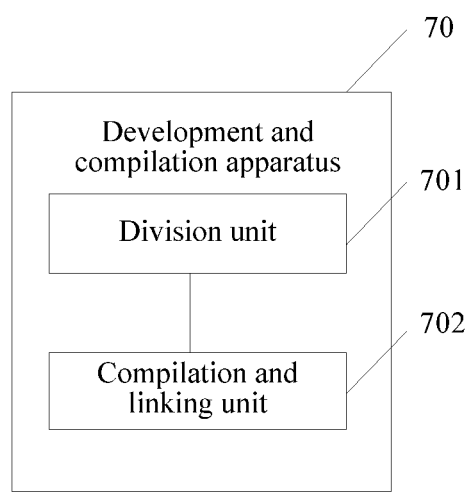
FIG. 7 is a schematic structural diagram of a development and compilation apparatus according to an embodiment of the present disclosure.

An embodiment of the present disclosure provides a development and compilation apparatus 70, as shown in FIG. 7, including:

a division unit 701, configured to divide a program of a system according to a link script of the system of an embedded apparatus, where the divided program includes a fast start loader program segment and program segments that are obtained by division according to service requirements of different services and that correspond to the different services, and the fast start loader is configured to copy a system image file from a loading domain to an execution domain; and a compilation and linking unit 702, configured to separately perform, according to the link script, compilation and linking on the fast start loader program segment and the program segments corresponding to the different services, to generate the system image file.

Optionally, the program segments corresponding to the different services include a fast startup program segment and a non-fast startup program segment, where the fast startup program segment corresponds to a mission-critical service in the embedded apparatus, and the non-fast startup program segment corresponds to remaining services in the embedded apparatus other than the mission-critical service.

Optionally, when the program segments corresponding to the different services are fast startup program segments, the compilation and linking unit 702 is configured to:

decompress, by using a first cross compilation command, a library file corresponding to each mission-critical service, and generate an intermediate file corresponding to each mission-critical service, where any intermediate file includes a read-only data segment, a data segment, and a text segment that are of a mission-critical service corresponding to any intermediate file; and link, by using a second cross compilation command, the intermediate file corresponding to each mission-critical service to an executable and linkable format ELF corresponding to the fast startup program segment, where in the executable and linkable format ELF corresponding to the fast startup program segment, a read-only data segment of each mission-critical service is in a same program segment, a data segment of each mission-critical service is in a same program segment, and a text segment of each mission-critical service is in a same program segment.

Optionally, the compilation and linking unit 702 is configured to:

compile, according to the link script, source code corresponding to each mission-critical service to generate a library file, where the library file includes a static library file or a dynamic library file.

Optionally, when the program segments corresponding to the different services are non-fast startup program segments, the compilation and linking unit 702 is configured to:

link, by using the second cross compilation command, a library file corresponding to the fast start loader program segment to an executable and linkable format ELF corresponding to the fast start loader program segment, and link a library file corresponding to the non-fast startup program segment to an ELF corresponding to the non-fast startup program segment, where a read-only data segment, a data segment, and a text segment that are of the fast start loader program segment are separately in a same program segment of the ELF; and a read-only data segment, a data segment, and a text segment that are of the non-fast startup program segment are separately in a same program segment of the ELF.

Optionally, the compilation and linking unit 702 is configured to:

compile, according to the link script, source code corresponding to the fast start loader program segment to generate a library file corresponding to the fast start loader program segment; and compile source code corresponding to the non-fast startup program segment, to generate a library file corresponding to the non-fast startup program segment.

Therefore, the development and compilation apparatus provided by this embodiment of the present disclosure divides an image file, and compiles and links different program segments obtained by division, so that after the image file is downloaded to an embedded apparatus, the embedded apparatus loads by segments and runs the image file, thereby increasing a start speed of the embedded apparatus.

Figure 8:
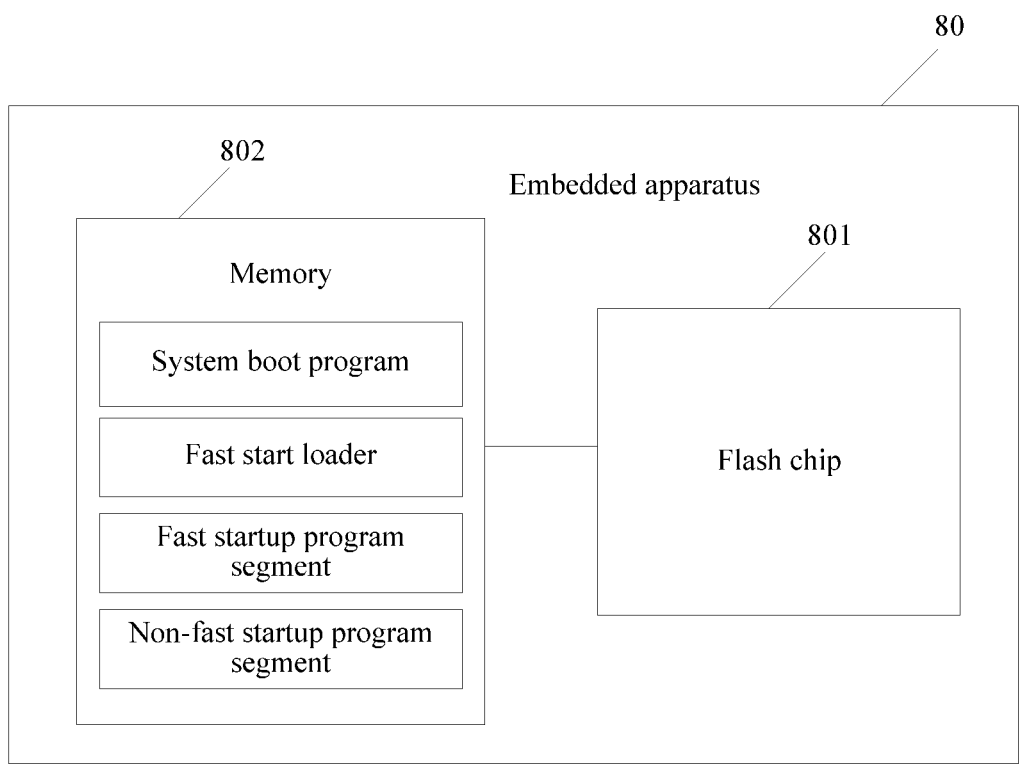
FIG. 8 is a schematic structural diagram of an embedded apparatus according to an embodiment of the present disclosure.

An embodiment of the present disclosure further provides an embedded apparatus 80. As shown in FIG. 8, the embedded apparatus 80 includes a Flash (Flash) chip 801 and a memory 802. The memory 802 includes a system boot program, a fast start loader, a fast startup program segment, and a non-fast startup program segment. For an implementation manner of the apparatus, refer to the foregoing embodiments shown in FIG. 3 and FIG. 6, and details are not described herein.

Figure 9:
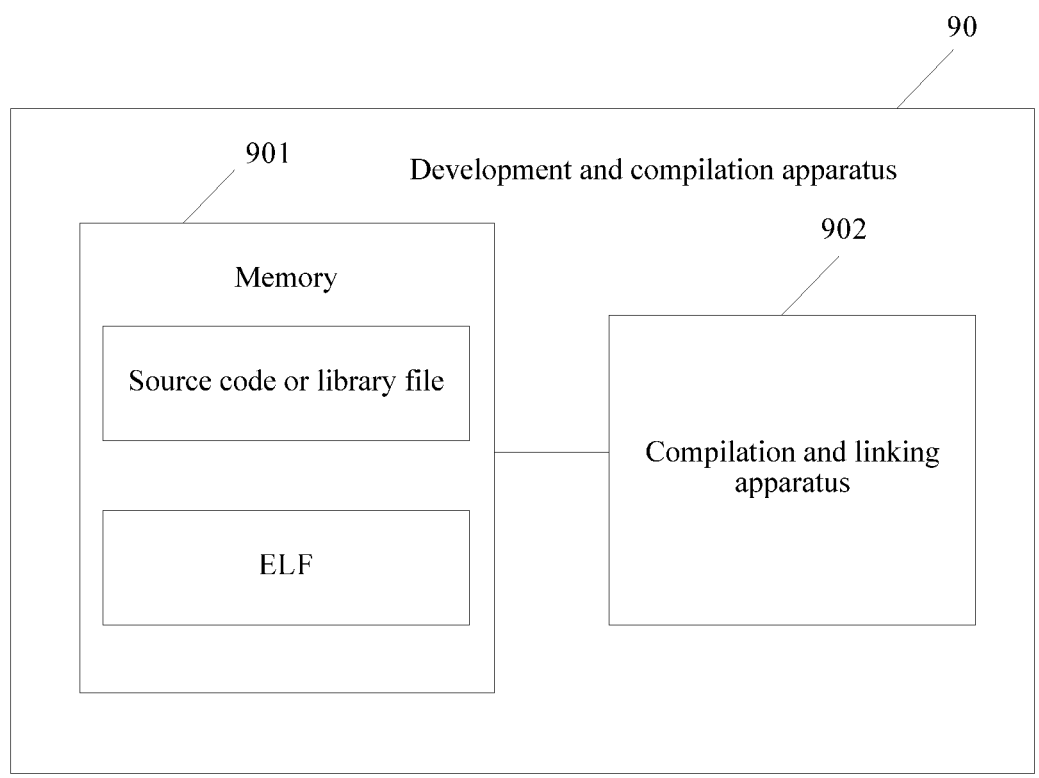
FIG. 9 is a schematic structural diagram of a development and compilation apparatus according to an embodiment of the present disclosure.

An embodiment of the present disclosure further provides a development and compilation apparatus 90. As shown in FIG. 9, the development and compilation apparatus 90 includes a memory 901 and a compilation and linking apparatus 902. The memory 901 includes source code or a library file, an ELF, and the like. The compilation and linking apparatus 902 is configured to compile and link the source code or the library file, to form an ELF. For an implementation manner of the apparatus, refer to the foregoing embodiments shown in FIG. 3 and FIG. 7, and details are not described herein.

Therefore, by means of the development and compilation apparatus and the embedded apparatus provided in the embodiments of the present disclosure, the development and compilation apparatus divides a program of a system of the embedded apparatus, where the divided program includes a fast start loader and program segments corresponding to different services. In this way, after the program segments obtained by division are compiled and linked to generate an image file for starting the system, the embedded apparatus may first load the fast start loader program segment in the image file after downloading the image file, then load, by segments according to service requirements by using the fast start loader, different services corresponding to remaining image files, and run the different services corresponding to the remaining image files. That is, in a start process of the embedded apparatus, the fast start loader program segment in the system image file is first loaded, that is, a smallest kernel is first loaded. After the kernel is started, different services corresponding to remaining image files are loaded by segments according to service requirements by using the fast start loader, and then the different services corresponding to the remaining image files are run. In this way, a service start time can be reduced, and a start speed of the embedded apparatus can be increased.

In the several embodiments provided in the present application, it should be understood that the disclosed terminal and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Program segments or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform the program segment blocks of the methods described in the embodiments of the present disclosure. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

Finally, it should be noted that the foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent replacements to program segment technical features thereof, without departing from the spirit and scope of the technical solutions of the embodiments of the present disclosure.

What is claimed is:

1. A method for starting an embedded apparatus in a start process, comprising:
    loading a fast start loader in a system image file by using a system boot program, wherein the fast start loader is a kernel of the embedded apparatus and is first loaded;
    running the fast start loader, wherein the fast start loader is configured to copy the system image file from a loading domain to an execution domain;
    loading, based on service requirements of different services after running the fast start loader, one or more services corresponding to remaining image files in the system image file other than the fast start loader, and running the one or more loaded services, including
        controlling the fast start loader to load a fast startup program segment in the system image file based on a start address of the fast startup program segment and a length of the fast startup program segment, wherein the fast startup program segment comprises a mission-critical service in the embedded apparatus, wherein the mission-critical service is determined based on service requirements, and wherein the mission-critical service is a designated service to be preferentially started;
    running the mission-critical service;
    subsequent to running the mission-critical service, controlling the fast start loader to load a non-fast startup program segment in the system image file based on a start address of the non-fast startup program segment and a length of the non-fast startup program segment, wherein the non-fast startup program segment comprises remaining services in the embedded apparatus other than the mission-critical service; and
    running the remaining services.

2. The method of claim 1, wherein controlling the fast start loader to load a fast startup program segment in the system image file comprises:
    controlling the fast start loader to obtain the start address and an end address of the fast startup program segment in the system image file; and
    controlling the fast start loader to obtain the length of the fast startup program segment based on the start address and the end address of the fast startup program segment.

3. The method of claim 1, wherein controlling the fast start loader to load a non-fast startup program segment in the system image file comprises:
    controlling the fast start loader to obtain the start address and an end address of the non-fast startup program segment in the system image file; and controlling the fast start loader to obtain the length of the non-fast startup program segment based on the start address and the end address of the non-fast startup program segment.

4. An embedded apparatus, comprising:
at least one processor, a memory storing computer executable instructions, which when executed by the at least one processor, cause the at least one processor to perform operations, the operations comprising:
loading a fast start loader in a system image file by using a system boot program, wherein the fast start loader is a kernel of the embedded apparatus and is first loaded;
running the fast start loader, wherein the fast start loader is configured to copy the system image file from a loading domain to an execution domain; and
loading, by segments based on service requirements of different services after running the fast start loader, one or more services corresponding to remaining image files in the system image file other than the fast start loader, and running the one or more loaded services, including
loading a fast startup program segment in the system image file based on a start address of the fast startup program segment and a length of the fast startup program segment, wherein the fast startup program segment comprises a mission-critical service in the embedded apparatus, wherein the mission-critical service is determined based on service requirements, and wherein the mission-critical service is a designated service to be preferentially started;
running the mission-critical service;
subsequent to running the mission-critical service, loading a non-fast startup program segment in the system image file based on a start address of the non-fast startup program segment and a length of the non-fast startup program segment, wherein the non-fast startup program segment comprises remaining services in the embedded apparatus other than the mission-critical service; and
running the remaining services.

5. The embedded apparatus of claim 4, wherein the fast start loader is configured to:
obtain the start address and an end address of the fast startup program segment in the system image file; and
obtain the length of the fast startup program segment based on the start address and the end address of the fast startup program segment.

6. The embedded apparatus of claim 4, wherein the fast start loader is configured to:
obtain the start address and an end address of the non-fast startup program segment in the system image file; and
obtain the length of the non-fast startup program segment based on the start address and the end address of the non-fast startup program segment.

* * * * *